United States Patent
Lee et al.

(10) Patent No.: US 11,967,858 B2
(45) Date of Patent: Apr. 23, 2024

(54) STATIC TRANSFER SWITCH, AND UPS MODULE TO WHICH STATIC TRANSFER SWITCH IS APPLIED

(71) Applicant: LS ELECTRIC CO., LTD., Anyang-si (KR)

(72) Inventors: Jiheon Lee, Anyang-si (KR); Dongjin Yun, Anyang-si (KR); Dohyun Kim, Anyang-si (KR); Jihong Kim, Anyang-si (KR); Minjun Park, Anyang-si (KR); Wonseok Do, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 118 days.

(21) Appl. No.: 17/772,632

(22) PCT Filed: Mar. 18, 2020

(86) PCT No.: PCT/KR2020/003679
§ 371 (c)(1),
(2) Date: Apr. 28, 2022

(87) PCT Pub. No.: WO2021/085759
PCT Pub. Date: May 6, 2021

(65) Prior Publication Data
US 2023/0034870 A1 Feb. 2, 2023

(30) Foreign Application Priority Data
Oct. 30, 2019 (KR) .................. 10-2019-0136834

(51) Int. Cl.
*H02J 9/06* (2006.01)
*H01H 9/54* (2006.01)
(Continued)

(52) U.S. Cl.
CPC ............. *H02J 9/061* (2013.01); *H01H 9/542* (2013.01); *H02J 9/062* (2013.01); *H02J 9/068* (2020.01);
(Continued)

(58) Field of Classification Search
CPC .. H01H 9/541; H01H 9/542; H01H 2009/546; H02H 7/268; H02J 9/062;
(Continued)

(56) References Cited

U.S. PATENT DOCUMENTS 4,618,906 A * 10/1986 Paice .................... H02H 3/023
361/57
2005/0184592 A1 8/2005 Marwali et al.
(Continued)

FOREIGN PATENT DOCUMENTS

CN 104485734 A 4/2015
CN 204271747 U 4/2015
(Continued)

OTHER PUBLICATIONS

Office Action for related Japanese Application No. 2022-522758; dated Apr. 25, 2023; (8 pages).
(Continued)

*Primary Examiner* — Ryan Johnson
(74) *Attorney, Agent, or Firm* — K&L Gates LLP

(57) ABSTRACT

The present disclosure relates to an uninterruptible power supply (UPS) system and, more specifically, to a static transfer switch (STS) that can be applied to a UPS module, the static transfer switch comprising: one semiconductor rectifying element connected to either the anode terminal or the cathode terminal of a direct current power source; a bypass circuit for connecting the input terminal and the output terminal of the semiconductor rectifying element so as to bypass the semiconductor rectifying element; a breaker
(Continued)

for opening or closing the bypass circuit; and a switch including a control unit, which controls the semiconductor rectifying element so as to conduct current when a preset conduction signal is received, controls the breaker so as to close the bypass circuit, and, when the bypass circuit is closed by the breaker, controls the semiconductor rectifying element so as to stop the conduction of current.

20 Claims, 6 Drawing Sheets

(51) Int. Cl.
*H02M 1/00* (2006.01)
*H02M 7/145* (2006.01)
(52) U.S. Cl.
CPC ......... *H02M 1/0067* (2021.05); *H02M 7/145* (2013.01)
(58) Field of Classification Search
CPC ...... H02J 9/068; H02J 9/06; H02J 1/12; H02J 3/007; H02J 1/108
See application file for complete search history.

(56) References Cited

U.S. PATENT DOCUMENTS

2017/0317526 A1 11/2017 Wang
2018/0131181 A1 5/2018 Compton

FOREIGN PATENT DOCUMENTS

| CN | 205921457 U | 2/2017 |
|---|---|---|
| CN | 205960785 U | 2/2017 |
| CN | 108649688 A | 10/2018 |
| CN | 106253461 B | 4/2019 |
| JP | S4715856 B | 5/1972 |
| JP | S62250835 A | 10/1987 |
| JP | H02142327 A | 5/1990 |
| JP | 2005287125 A | 10/2005 |
| JP | 2005354781 A | 12/2005 |
| JP | 2009148008 A | 7/2009 |
| JP | 5357616 B2 | 12/2013 |
| JP | 2014110725 A | 6/2014 |
| JP | 2015070637 A | 5/2015 |
| JP | 2015164376 A | 9/2015 |
| KR | 20080104102 A | 12/2008 |
| KR | 20180083931 A | 7/2018 |
| WO | 2019031686 A1 | 2/2019 |

OTHER PUBLICATIONS

International Search Report for related International Application No. PCT/KR2020/003679; dated May 6, 2021; (5 pages).
Written Opinion for related International Application No. PCT/KR2020/003679; dated May 6, 2021; (5 pages).
Korean Notice of Allowance for related Korean Application No. 10-2019-0136834; dated Jun. 30, 2021; (2 pages).
Korean Office Action for related Korean Application No. 10-2019-0136834; dated Dec. 28, 2020; (4 pages).
Search Report for related Korean Application No. 10-2019-0136834; dated Jun. 30, 2021; (2 pages).

* cited by examiner

STATIC TRANSFER SWITCH, AND UPS MODULE TO WHICH STATIC TRANSFER SWITCH IS APPLIED

CROSS-REFERENCE TO RELATED APPLICATIONS

This application is the National Stage filing under 35 U.S.C. 371 of International Application No. PCT/KR2020/003679, filed on Mar. 18, 2020 which claims the benefit of earlier filing date and right of priority to Korea utility model Application No. 10-2019-0136834 filed on Oct. 30, 2019, the contents of which are all hereby incorporated by reference herein in their entirety.

FIELD

The present disclosure relates to an uninterruptible power supply (UPS) module, and more particularly, to a static transfer switch (STS) that can be applied to the UPS module.

BACKGROUND

At present, industrial systems tend to be advanced according to the development of technologies, and automated and high-speed industrial devices are being operated according to these advanced industrial systems.

When a problem occurs in a power system for supplying power to the industrial devices due to the automation and high-speed of these industrial devices, enormous damage may occur due to a power outage. Furthermore, since the problem of the power system may cause damage to industrial devices that receive power, the damage may be further increased. Therefore, when a problem such as a sudden power outage or abnormal current or the like occurs in a power system, a UPS module that supplies alternative power to loads, that is, industrial devices, using a battery charged with a predetermined amount of current, may be introduced, thereby supplying stable power even in the event of an abnormality in the power system of a commercial power source.

However, the UPS module typically supplies alternative power using a battery. Therefore, there is a problem in that power supplied to a load is stopped when a current charged in the battery is completely discharged.

As such, a conventional UPS apparatus has a limited supply time period of alternative power according to a charging capacity of the battery, and thus a battery having a higher charging capacity has been required. However, in the case of a battery, since its price is determined according to the charging capacity, there is a problem in that a price of the UPS apparatus increases according to the charging capacity of the battery.

As a method to solve such a problem, a UPS module that is further provided with a path connected to a standby power source (hereinafter referred to as bypass power source) as well as a battery to allow power to be supplied through the standby power source has emerged. In the case of such a UPS module, power may be supplied to a load by receiving power from the standby power source even after the battery is completely discharged, so there is an advantage in that power can be supplied to the load even when the battery is completely discharged.

However, in the case of advanced industrial devices, static power supply is required, and when a standby power source is connected thereto, there is a problem in that a power supply path must be switched within a very short time period to a path to which the standby power source is connected. Therefore, methods for allowing the switching of the power supply path to the standby power source to be performed for a shorter time period are being actively studied.

SUMMARY

The present disclosure is aimed to solve the foregoing and other problems, and an aspect of the present disclosure is to provide a static transfer switch and a UPS module capable of allowing switching of a power supply path to be performed at a higher speed.

In addition, another aspect of the present disclosure is to provide a static transfer switch and UPS module capable of receiving a current from a standby power source and delivering the current to a load within a shorter time period when power supplied from a commercial power source and a battery is interrupted.

In order to achieve the above and other objectives, according to an aspect of the present disclosure, a switch according to an embodiment of the present disclosure may include one semiconductor rectifier element connected to either one of a positive terminal and a negative terminal of a DC power source, a bypass electric circuit that connects an input terminal and an output terminal of the semiconductor rectifier element to bypass the semiconductor rectifier element, a breaker that opens or closes the bypass electric circuit, and a control unit that controls the semiconductor rectifier element to conduct a current, and controls the breaker to close the bypass electric circuit when a preset conduction signal is received, and controls the semiconductor rectifier element to stop the conduction of the current when the bypass electric circuit is closed by the breaker.

According to an embodiment, the semiconductor rectifier element may be a silicon controlled rectifier element.

According to an embodiment, the control unit may control the silicon controlled rectifier element and the breaker at the same time according to the conduction signal, detect whether the bypass electric circuit is closed when a current is first conducted through the silicon controlled rectifier element due to an operating speed difference between the silicon controlled rectifier element and the breaker, and control the silicon controlled rectifier element to stop the conduction of the current according to the detection result.

According to an embodiment, the switch may further include a second semiconductor rectifier element connected to a polarity terminal and the other polarity terminal of the DC power source to which the semiconductor rectifier element and the bypass electric circuit of claim 1 are connected, a second bypass electric circuit that connects an input terminal and an output terminal of the second semiconductor rectifier element to bypass the second semiconductor rectifier element, and a second breaker controlled by the control unit to open or close the second bypass electric circuit, wherein the control unit controls the second semiconductor rectifier element to conduct a current, and controls the second breaker to close the second bypass electric circuit when the conduction signal is received, and further controls the semiconductor rectifier element to stop the conduction of the current when the second bypass electric circuit is closed by the second breaker.

According to an embodiment, the semiconductor rectifier element and the second semiconductor rectifier element may be arranged such that forward current directions thereof coincide with current directions of the DC power source, and arranged in different directions according to the polarities of the DC power source connected thereto.

According to an embodiment, the control unit may determine whether the bypass electric circuit is closed based on a feedback signal received from the breaker or a voltage change of a current supplied through the bypass electric circuit or the semiconductor rectifier element.

In order to achieve the above or other objectives, according to an aspect of the present disclosure, a static transfer switch according to an embodiment of the present disclosure may include an AC-DC converter that converts an AC current supplied from a preset AC power source into a DC current, first and second semiconductor rectifier elements connected to positive and negative output terminals of the AC-DC converter, respectively, first and second bypass electric circuits that connect an input terminal and an output terminal of each of the first and second semiconductor rectifier elements to bypass the first and second semiconductor rectifier elements, first and second breakers that open or close the first and second bypass electric circuits, and a control unit that controls the first and second semiconductor rectifier elements or the first and second breakers to conduct currents of the positive and negative output terminals of the AC-DC converter through either one of first paths passing through the first and second semiconductor rectifier elements or second paths passing through the first and second bypass electric circuits when a preset conduction signal is received.

According to an embodiment, the first and second semiconductor rectifier elements may be silicon controlled rectifier elements, respectively.

According to an embodiment, the control unit may turn on the first and second silicon controlled rectifier elements to conduct currents therethrough, control the first and second breakers to close the first and second bypass electric circuits when the conduction signal is received, allow currents to be first conducted through the first and second silicon controlled rectifier elements according to an operating speed difference between the silicon controlled rectifier element and the breaker, and turn off the first and second silicon controlled rectifier elements when the first and second bypass electric circuits are closed while the currents are conducted through the first and second silicon controlled rectifier elements.

According to an embodiment, the control unit may determine whether the first and second bypass electric circuits are closed based on a feedback signal from the first and second breakers or a voltage change of a current supplied through the first and second bypass electric circuits or the first and second silicon controlled rectifier elements.

According to an embodiment, when currents are conducted through the first and second silicon controlled rectifier elements before the first and second bypass electric circuits are closed, currents of the positive and negative output terminals of the AC-DC converter may be output through the first paths, wherein when the first and second bypass electric circuits are closed while the currents are conducted through the first and second silicon controlled rectifier elements, the currents of the positive and negative output terminals of the AC-DC converter are output through both the first paths and the second paths, and when the first and second silicon controlled rectifier elements are turned off while the first and second bypass electric circuits are closed, the currents of the positive and negative output terminals of the AC-DC converter are output only through the second paths.

According to an embodiment, the AC-DC converter may include a rectifier element bridge comprising a plurality of rectifier elements, wherein the rectifier elements are diodes or silicon controlled rectifier elements.

According to an embodiment, the preset AC power source may be a standby power source that supplies power to a load through a path different from that of the commercial power source, wherein the preset conduction signal, which is a signal that controls the control unit to output a current supplied from the standby power source, is received from another power supply control apparatus connected to the commercial power source.

In order to achieve the above or other objectives, according to an aspect of the present disclosure, an uninterruptible power supply (UPS) module may include a first power supply control module comprising a first AC-DC converter that converts an AC current supplied from a commercial power source into a DC current to output the converted DC current, a second power supply control module comprising a DC-DC converter that stabilizes a DC current supplied from a battery or converts the DC current into a DC current at a different voltage to output the converted DC current, a third power supply control module comprising a second AC-DC converter that converts an AC current supplied from a standby power source into a DC current to output the converted DC current, and a common output terminal defined by connecting output terminals of the first to third power supply control modules to one another to supply a DC current output from any one of the first to third power supply control modules to a load, wherein in the third power supply control module, breakers and silicon controlled rectifier elements paired with each other are connected in parallel between an output terminal of the second AC-DC converter and the common output terminal, and wherein in the breakers and the silicon controlled rectifier elements paired with each other, one breaker and one silicon controlled rectifier element are paired with each other to connect in parallel between the output terminal of the second AC-DC converter and the common output terminal.

According to an embodiment, the third power supply control module may include first and second silicon controlled rectifier elements connected between positive and negative output terminals of the second AC-DC converter and positive and negative output terminals of the third power supply control module, respectively, first and second bypass electric circuits connected between an input terminal and an output terminal of each silicon controlled rectifier element to bypass the first and second silicon controlled rectifier elements, respectively, first and second breakers that open or close the first and second bypass electric circuits, and a switch provided with a switch control unit that turns on the first and second silicon controlled rectifier elements to conduct currents therethrough, controls the first and second breakers to close the first and second electric circuits when the conduction signal is received, and turns off the first and second silicon controlled rectifier elements when the first and second bypass circuits are closed while currents are first conducted through the first and second silicon controlled rectifier elements according to an operating speed difference between the silicon controlled rectifier element and the breaker.

According to an embodiment, the conduction signal may be received from a first control unit of the first power supply control module, wherein the first control unit transmits the preset conduction signal to the switch control unit when both power supply of the commercial power source and power supply from the battery are stopped.

According to an embodiment, the first and second breakers may close the first and second bypass electric circuits according to the control of the switch control unit in a default state in which the first and second bypass circuits are open, and the first and second silicon controlled rectifier elements may be turned on according to the control of the switch control unit in a default state that is turned off.

According to an embodiment, a plurality of breakers may be included between the commercial power source and the common output terminal, and between the battery and the common output terminal, respectively, wherein the plurality of breakers are configured to be cut off between the commercial power source and the common output terminal or between the battery and the common output terminal when an overcurrent flows from the commercial power source or the battery in a default state that is configured to connect between the commercial power source and the common output terminal or between the battery and the common output terminal.

In order to achieve the above or other objectives, according to an aspect of the present disclosure, a UPS module according to an embodiment of the present disclosure may include a first module connected to a commercial power source and a battery, the first module comprising a first AC-DC converter that converts an AC current supplied from the commercial power source into a DC current, and a DC-DC converter that stabilizes a DC current supplied from the battery or converts the DC current into a DC current at a different voltage, so as to output either one of a current supplied from the commercial power source and a current supplied from the battery through a first output terminal defined by connecting an output of the first AC-DC converter and an output of the DC-DC converter to each other, a second module comprising a second AC-DC converter that converts an AC current supplied from a standby power source into a DC current to output the converted DC current, and a second output terminal defined by connecting the first output terminal and an output terminal of the second module to each other to supply a DC current output from either one of the first module and the second module to a load, wherein in the second module, breakers and silicon controlled rectifier elements paired with each other are connected in parallel between an output terminal of the second AC-DC converter and the second output terminal, and wherein in the breakers and the silicon controlled rectifier elements paired with each other, one breaker and one silicon controlled rectifier element are paired with each other to connect in parallel between the output terminal of the second AC-DC converter and the second output terminal.

According to an embodiment, the second module may be provided with a switch, and the switch may include first and second silicon controlled rectifier elements (thyristors) connected between positive and negative output terminals of the second AC-DC converter and positive and negative output terminals of the second module, respectively, first and second bypass electric circuits connected between an input terminal and an output terminal of each silicon controlled rectifier element to bypass the first and second silicon controlled rectifier elements, respectively, first and second breakers that control the opening or closing of the first and second bypass electric circuit, and a switch control unit that turns on the first and second silicon controlled rectifier elements to conduct currents therethrough, controls the first and second breakers to close the first and second bypass electric circuits when a preset conduction signal is received, allows currents to be first conducted through the first and second silicon controlled rectifier elements according to an operating speed difference between the silicon controlled rectifier element and the breaker, and turns off the first and second silicon controlled rectifier elements when the first and second bypass electric circuits are closed while the currents are conducted through the first and second silicon controlled rectifier elements.

According to an embodiment, the first module may be controlled by a first control unit, wherein the first control unit transmits the preset conduction signal to the switch control unit when both power supply of the commercial power source and power supply from the battery are stopped.

The effects of a static transfer switch according to the present disclosure and a UPS module to which the static transfer switch is applied will be described as follows.

According to at least one of embodiments of the present disclosure, the present disclosure may receive a direct current, and supply the received direct current through either one of one silicon controlled rectifier element (thyristor) and a bypass electric circuit that bypasses the silicon controlled rectifier element, thereby having an effect capable of reducing the number of silicon controlled rectifier elements provided therein and further reducing a time period required until the current is supplied to a load.

According to at least one of embodiments of the present disclosure, the present disclosure may be provided with an AC-DC converter at a front end of a static transfer switch to convert an AC current supplied from a standby power source into a DC current of a predetermined level, and supply the converted DC current to the static transfer switch, thereby having an effect capable of allowing the static transfer switch to supply a current of the standby power source to a load through either one of one silicon controlled rectifier element and a bypass electric circuit that bypasses the silicon controlled rectifier element.

DETAILED DESCRIPTION

Figure 1:
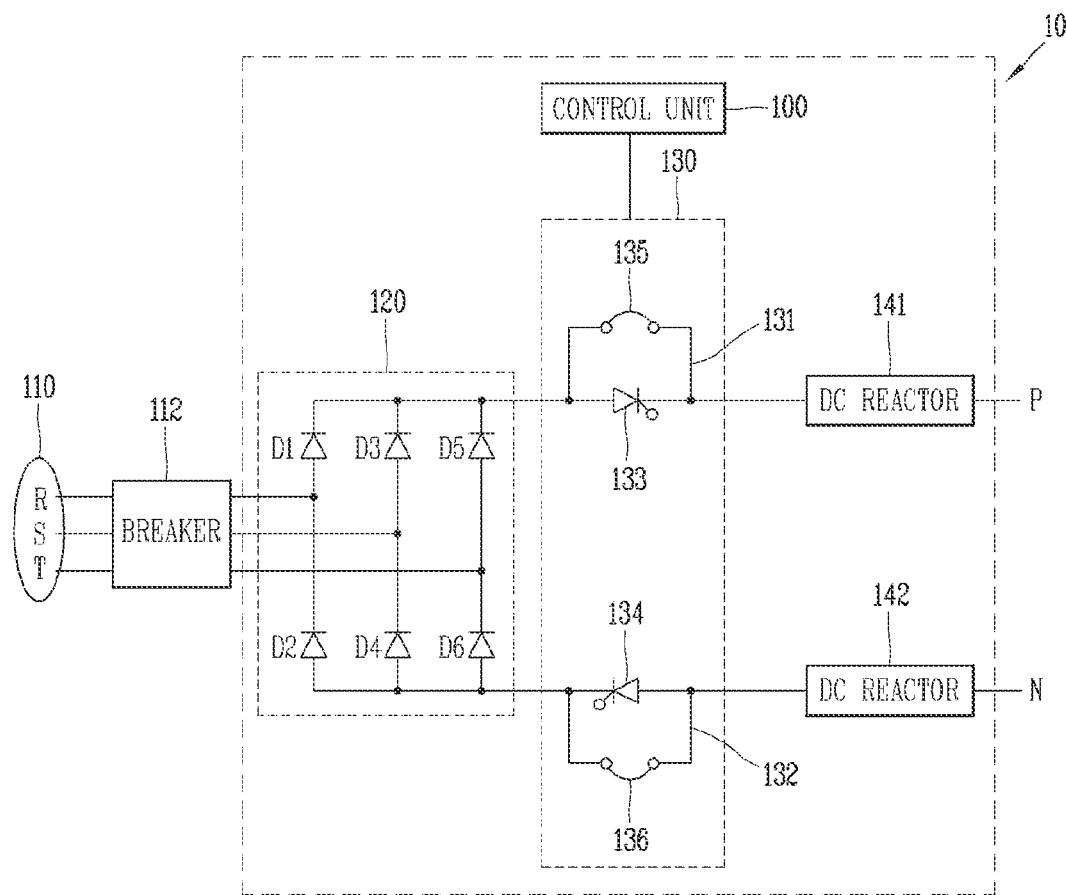
FIG. 1 is a block diagram for explaining a static transfer switch according to the present disclosure.

Hereinafter, embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is determined to obscure the gist of the embodiments disclosed herein. In addition, the accompanying drawings are provided only for a better understanding of the embodiments disclosed herein and are not intended to limit technical ideas disclosed herein, and therefore, it should be understood that the accompanying drawings include all modifications, equivalents and substitutions within the scope and sprit of the present disclosure.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation unless it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

First, FIG. 1 is a block diagram for explaining a static transfer switch (STS) 10 related to the present disclosure.

Referring to FIG. 1, the static transfer switch 10 related to the present disclosure may include a control unit 100 and a switch 130 controlled by the control unit 100, and may further include an AC-DC converter 120 capable of converting an input AC current into a DC current. Furthermore, a positive terminal and a negative terminal of the switch 130 may be respectively connected to a positive output terminal P and a negative output terminal N of the static transfer switch 10. In addition, the DC current converted by the AC-DC converter 120 may be output through the output terminals (the positive output terminal P and the negative output terminal N) of the static transfer switch 10.

Here, the AC-DC converter 120 may convert an input multi-phase AC current into a DC current. To this end, the AC-DC converter 120 may include a bridge rectifier circuit to which a plurality of rectifier elements are connected. The rectifier elements may be diodes or silicon controlled rectifier elements (SCRs). However, in the following description, it will be described on the assumption that the rectifier element is a diode.

The diodes provided in the AC-DC converter 120 may be wired in a bridge shape as shown in FIG. 1. In this case, when the input AC current is a three-phase (R-phase, S-phase, T-phase) AC current 110, the AC-DC converter 120 may include six diodes D1 to D6 wired in a bridge shape as shown in FIG. 1 to convert the three-phase AC current 110 into a DC current.

Furthermore, as shown in FIG. 1, when the three-phase AC current 110 is input, each phase voltage (R-phase voltage/S-phase voltage/T-phase voltage) may be applied to each diode of the AC-DC converter 120. More specifically, the R-phase voltage may be applied to the first and second diodes D, D2 and the S-phase voltage may be applied to the third and fourth diodes D3, D4. In addition, the T-phase voltage may be applied to the fifth and sixth diodes D5, D6. Furthermore, each diode may full-wave rectify a voltage corresponding to each phase.

In addition, the AC-DC converter 120 may sequentially output the full-wave rectified phase voltages Vr/Vs/Vt. Therefore, the output voltage may be subjected to a smoothing operation, and thus converted into a DC current to be output.

Meanwhile, at least one breaker 112 such as a Molded Circuit Breaker (MCCB) or an Air Circuit Breaker (ACB) may be provided between the three-phase AC current 110 and the AC-DC converter 120 to protect a circuit of the static transfer switch 10 from an overcurrent or arc.

Furthermore, the switch 130 may connect an output terminal of the AC-DC converter 120 and an output terminal of the static transfer switch 10 in parallel through a semiconductor rectifier element and a breaker.

The semiconductor rectifier element may be a high-speed, high-current, high-voltage switching device that has a response speed and an operating speed above a preset value, can control a large amount of power, and has a semi-permanent lifespan. For an example of such a semiconductor rectifier element, there is a silicon controlled rectifier (SCR) element such as a thyristor. In the following description, it will be described on the assumption that a silicon controlled rectifier element is provided as the semiconductor rectifier element.

More specifically, the switch 130 may include a first silicon controlled rectifier element 133 disposed between a positive terminal of an output terminal of the AC-DC converter 120 and a positive output terminal P of the static transfer switch 10. Here, the first silicon controlled rectifier element 133 may be disposed such that a forward current direction thereof coincides with a current direction of the positive terminal current, that is, an anode current, of the output terminal of the AC-DC converter 120.

Furthermore, the switch 130 may include a first bypass electric circuit 131 that connects between an input terminal and an output terminal of the first silicon controlled rectifier element 133, and bypasses the first silicon controlled rectifier element 133 to connect between the positive terminal of the output terminal of the AC-DC converter 120 and the positive output terminal P of the static transfer switch 10, and a first breaker 135 that controls the opening of closing of the first bypass electric circuit 131.

Accordingly, the positive terminal of the AC-DC converter 120 is electrically connected to the positive output terminal (P) of the static transfer switch 10 through either one of the first silicon controlled rectifier element 133 or the first bypass electric circuit 131 (when the first bypass electric circuit 131 is closed).

In addition, the switch 130 may include a second silicon controlled rectifier element 134 disposed between the negative terminal of the output terminal of the AC-DC converter 120 and the negative output terminal N of the static transfer switch 10. Here, the second silicon controlled rectifier element 134 may be disposed such that a forward current direction thereof coincides with a current direction of the negative terminal current, that is, a cathode current, of the output terminal of the AC-DC converter 120.

Furthermore, the switch 130 may include a second bypass electric circuit 132 that connects between an input terminal and an output terminal of the second silicon controlled rectifier element 134, and bypasses the second silicon controlled rectifier element 134 to connect between the negative terminal of the output terminal of the AC-DC converter 120 and the negative output terminal N of the static transfer switch 10, and a second breaker 136 that controls the opening of closing of the second bypass electric circuit 132.

Accordingly, the negative terminal of the AC-DC converter 120 is electrically connected to the negative output terminal (N) of the static transfer switch 10 through either one of the first silicon controlled rectifier element 134 or the first bypass electric circuit 132 (when the second bypass electric circuit 132 is closed).

Furthermore, first and second DC reactors 141, 142 may be further disposed between the output terminals of the first and second silicon controlled rectifier elements 133, 134 and the positive output terminal (P) and the negative output terminal (N) of the static transfer switch 10, respectively. Here, the first and second DC reactors 141, 142, which are induction reactors between a DC output and a load, may limit a fault current or control a pulsation of the load.

Meanwhile, when a preset conduction signal is received, the control unit 100 may control the first and second silicon controlled rectifier elements 133, 134 and the first and second breakers 135, 136 to electrically connect the output terminals of the AC-DC converter 120 and the output terminals of the static transfer switch 10 through either one of each silicon controlled rectifier element or each bypass electric circuit.

Here, the three-phase alternating current 110 may be a preset standby power source (bypass power source). In this case, the conduction signal may be a signal transmitted to the control unit 100 to supply the power of the standby power source to the load when the power supply is stopped while alternative power is supplied to the load through the battery due to a problem occurring in a power system of a commercial power source.

In this case, the control unit 100 that has received the conduction signal may control the switch 130 to electrically connect the output terminal of the AC-DC converter 120 to the output terminal of the static transfer switch 10 within a time period (e.g., 4 ms) required for static power supply. Accordingly, when the output terminal of the AC-DC converter 120 and the output terminal of the static transfer switch 10 are electrically connected, an AC current supplied from the standby power source is output in the form of a DC current to a load (or a power converter connected to the load).

Meanwhile, since the silicon controlled rectifier elements 133, 134 have a very fast response speed (operating speed) due to the characteristics of the elements, the output terminals (positive and negative terminals) of the AC-DC converter 120 and the output terminals (the positive output terminal P and the negative output terminal N) of the static transfer switch 10 may be electrically connected in a very short time period. On the contrary, since the silicon controlled rectifier elements 133, 134 are semiconductor elements, when a current conduction time period increases, heat may be generated accordingly, thereby causing circuit damage due to heat generation.

On the other hand, in the case of the breakers 135, 136, although there is an advantage in that heat is not generated, the response speed (operating speed) is slow, and thus there is a disadvantage in that it is difficult to electrically connect the output terminals (positive and negative terminals) of the AC-DC converter 120 to the output terminals (the positive output terminal (P) and the negative output terminal (N)) of the static transfer switch 10 within a required time period.

Therefore, the control unit 100 first turns on the silicon controlled rectifier element capable of performing high-speed switching to electrically connect the output terminals of the AC-DC converter 120 and the output terminals of the static transfer switch 10. Furthermore, when the output terminal of the AC-DC converter 120 and the output terminal of the static transfer switch 10 area electrically connected through the bypass electric circuit, the silicon controlled rectifier element is turned off to stop the conduction of a current through the silicon controlled rectifier element.

Accordingly, the control unit 100 may electrically connect the output terminal of the AC-DC converter 120 to the output terminal of the static transfer switch 10 within a time period required for the static power supply as well as prevent damage due to the heat generation of the silicon controlled rectifier element.

Figure 2:
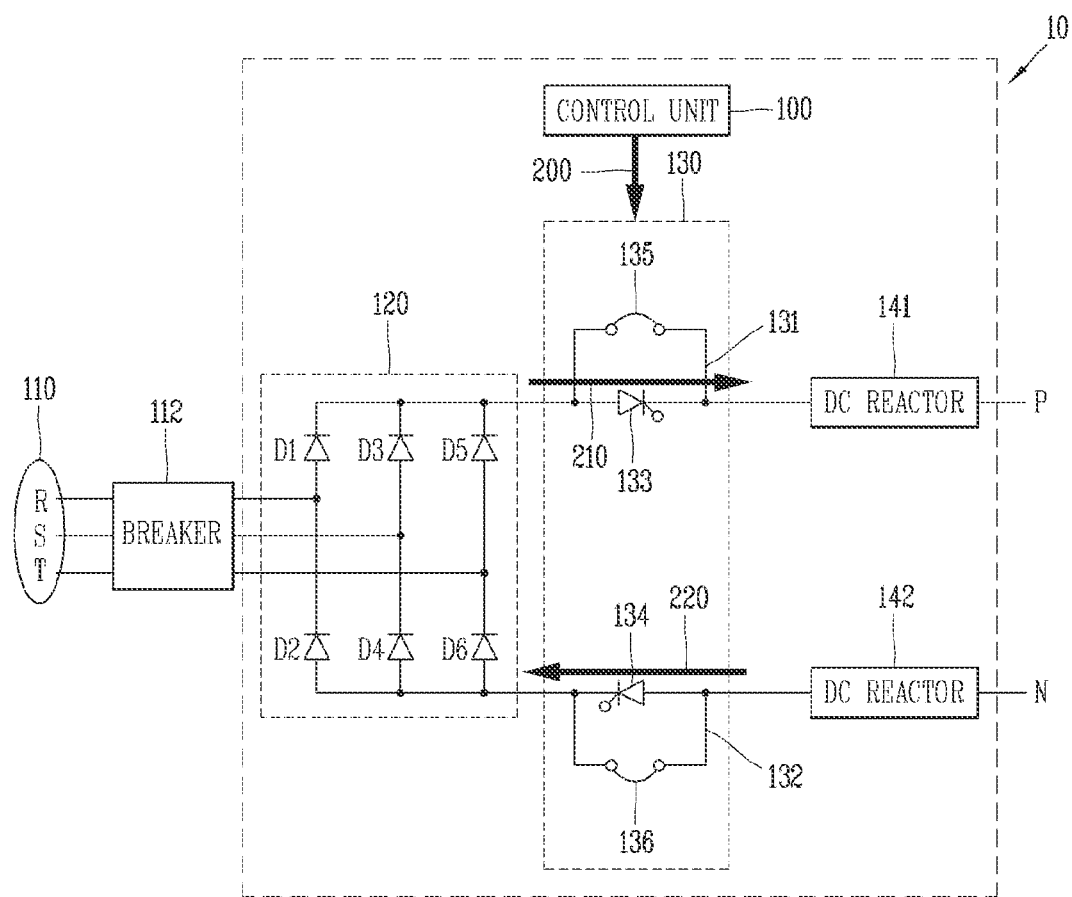
FIGS. 2 to 4 are exemplary views for explaining a process in which a current of a standby power source is supplied to a load through a silicon controlled rectifier element or a bypass electric circuit according to the control of a control unit 100 in a static transfer switch related to the present disclosure.
Figure 3:
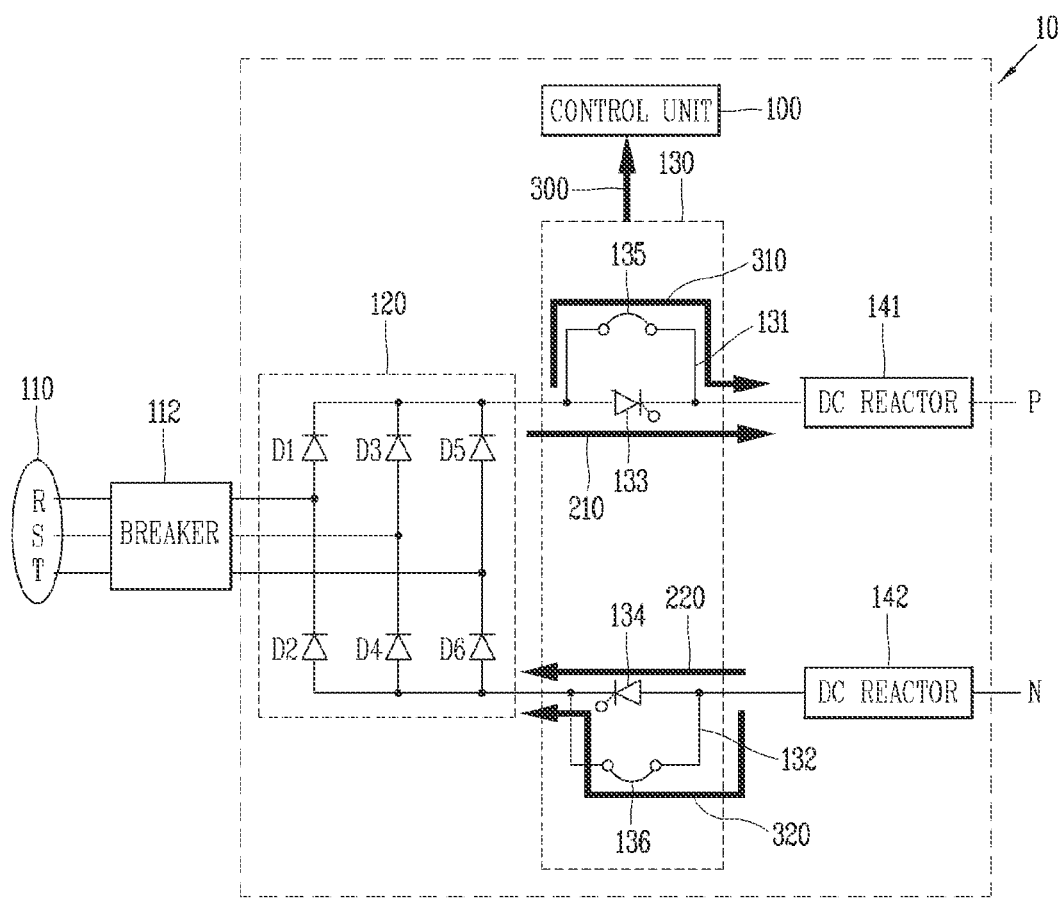
Figure 4:
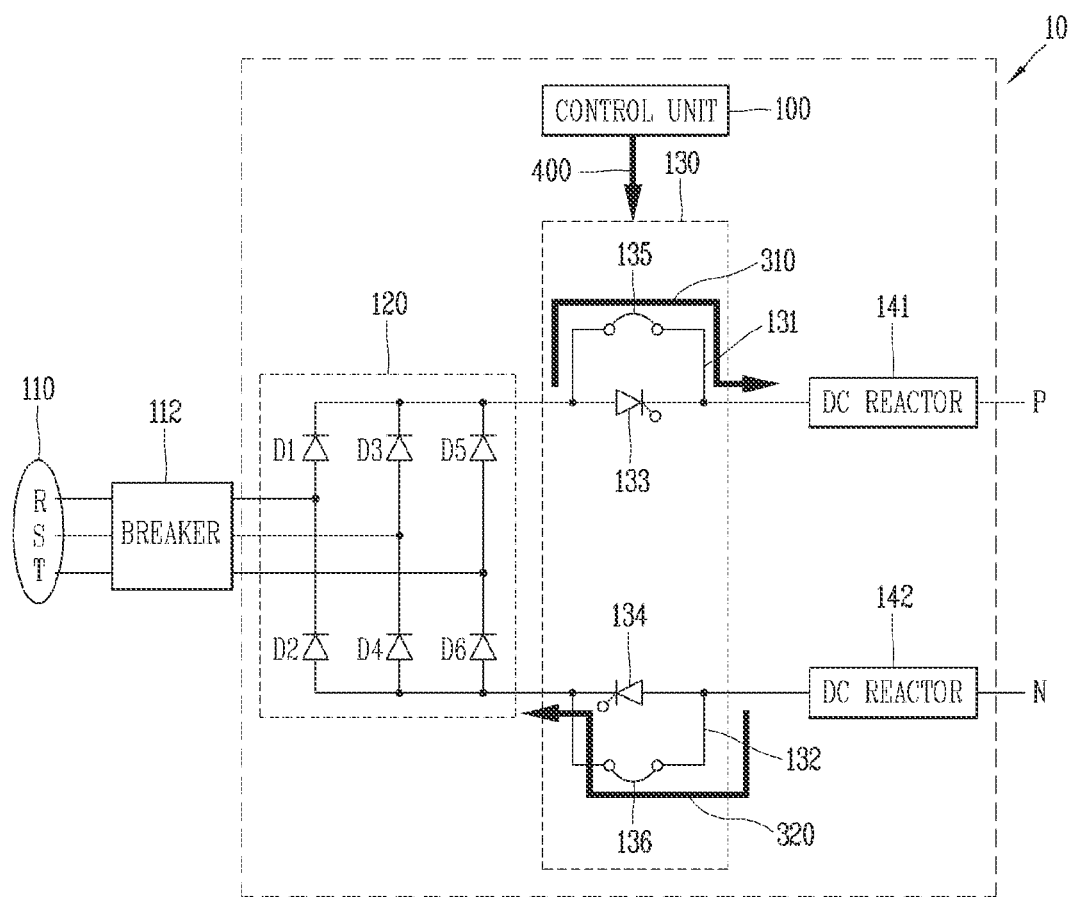

FIGS. 2 to 4 are exemplary views for more specifically explaining a process in which a current of a standby power source is supplied to a load through a silicon controlled rectifier element or a bypass electric circuit according to the control of the control unit 100 in the static transfer switch 10 related to the present disclosure.

First, when a preset conduction signal is not received, the output terminal of the AC-DC converter 120 and the output terminal of the static transfer switch 10 may be maintained in a state of not being connected to each other. That is, the first and second silicon controlled rectifier elements 133, 134 may be in a turned-off state, and the first and second bypass electric circuits 131, 132 may be in an open state by the first and second breakers 135, 136 that are open.

In this state, when the preset conduction signal is received, the control unit 100 simultaneously controls the first and second silicon controlled rectifier elements 133, 134 and the first and second breakers 135, 136 to turn on the first and second silicon controlled rectifier elements 133, 134, and close the first and second breakers 135, 136. In this case, control signals (turn-on signals) for turning on the first and second silicon controlled rectifier elements 133, 134 and control signals (close signals) for closing the first and second breakers 135, 136 may be simultaneously output and input to the switch 130 (200).

Then, the turn-on signals and the close signals may be simultaneously received by the first and second silicon controlled rectifier elements 133, 134 and the first and second breakers 135, 136, respectively. However, as described above, since the operating speed of the silicon controlled rectifier element is much faster than that of the breaker, the first and second silicon controlled rectifier elements 133, 134 may be turned on before the first and second breakers 135, 136 are closed.

Therefore, before the first and second bypass electric circuits 131, 132 are closed, the output terminals of the AC-DC converter 120 and the output terminals of the static transfer switch 10 may be electrically connected through the first and second silicon controlled rectifier elements 133, 134 that are turned on. Accordingly, as shown in current output paths 210, 220 of FIG. 2, an AC current supplied from the standby power source is output in the form of a DC current through the silicon controlled rectifier elements 133, 134 and supplied to a load (or a power converter connected to the load).

Meanwhile, the first and second bypass electric circuits 131, 132 may be closed in a state where the output terminals of the AC-DC converter 120 and the output terminals of the static transfer switch 10 are first electrically connected through the first and second silicon-controlled rectifier elements 133, 134 according to an operating speed difference between the silicon-controlled rectifier element and the breaker.

In this case, as shown in FIG. 3, the output terminals of the AC-DC converter 120 and the output terminals of the static transfer switch 10 may be electrically connected not only through the first and second silicon controlled rectifier elements 133, 134 but also through the first and second bypass electric circuits 131, 132. Accordingly, as shown in FIG. 3, an AC current supplied from the standby power source may be output in the form of a DC current and supplied to a load (or a power converter connected to the load) through paths 310, 320 that pass through the first and second bypass electric circuits 131, 132 as well as paths 210, 220 that pass through the first and second silicon controlled rectifier elements 133, 134. Meanwhile, as the number of paths through which a current is supplied to the load increases, a voltage of the first electrically connected paths (the paths 210, 220 through which the current is supplied via the first and second silicon controlled rectifier elements 133, 134) will be lowered.

Meanwhile, as the first and second breakers 135, 136 are closed, the control unit 100 may detect that the first and second bypass electric circuits 131, 132 are closed (300). For example, the control unit 100 may receive a feedback signal from the first and second breakers 135, 136 to determine that the first and second breakers 135, 136 have been closed. Alternatively, the controller unit 100 may detect whether the first and second bypass electric circuits 131, 132 are closed through a voltage change of the paths 210, 220 to which a current is supplied via the first and second silicon controlled rectifier elements 133, 134. Alternatively, whether the first and second bypass electric circuits 131, 132 are closed may be detected based on a voltage detected from the first and second bypass electric circuits 131, 132.

Furthermore, when the closing of the first and second bypass electric circuits 131, 132 is detected, the control unit 100 may transmit a turn-off signal to the first and second silicon controlled rectifier elements 133, 134. Then, the first and second silicon controlled rectifier elements 133, 134 that have received the signal may be switched to a turned-off state, and accordingly, the conduction of a current through the first and second silicon controlled rectifier elements 133, 134 may be stopped.

Therefore, as shown in FIG. 4, the output terminals of the AC-DC converter 120 and the output terminals of the static transfer switch 10 may be electrically connected only through the closed first and second bypass electric circuits 131, 132. Accordingly, an AC current supplied from the standby power source may be output in the form of a DC current through the first and second bypass electric circuits 131, 132.

As shown in FIGS. 2 to 4, the present disclosure may allow the silicon controlled rectifier element and the breaker to be connected in parallel to each other, and when a preset conduction signal is received, the standby power source may be first connected through the silicon controlled rectifier element before through the breaker, thereby supplying power to the load with no interruption (static) of power supply. Furthermore, when the standby power source is connected through the breaker according to a difference in operating speed, the connection of the standby power source through the silicon controlled rectifier element may be cut off, thereby preventing heat from being generated due to current conduction in the silicon controlled rectifier having a semiconductor element.

Furthermore, the static transfer switch 10 according to an embodiment of the present disclosure may connect the AC-DC converter 120 to the standby power source for supplying the multi-phase AC current so as to convert the multi-phase AC current into a DC current. In addition, a state in which the silicon controlled rectifier element is turned off and the breaker is open may be maintained as an initial state of the switch 130, thereby preventing a current from flowing to the load through the switch 130 while the converted DC current is input to the switch 130 so as to maintain a voltage at an input terminal of the breaker above a predetermined level until a preset conduction signal is received.

Therefore, when the switch 130 is controlled by the control unit 100 such that the output terminal of the AC-DC converter 120 and the output terminal of the static transfer switch 10 are electrically connected to allow a current of the standby power source to flow to the load, a DC current that maintains the voltage may be directly supplied to a load (or a power converter connected to the load) through the switch 130. Therefore, the converted DC current may be directly output without going through a time period required for current conversion (AC-DC conversion), and accordingly, when the supply of current through the commercial power and the battery is stopped, a current of the standby power source may be seamlessly supplied to the load.

As such, the static transfer switch 10 of the present disclosure, which is an apparatus that receives a DC current and controls the supply of the input DC current to a load, may have a structure in which one breaker is connected in parallel to one silicon controlled rectifier element as shown in FIGS. 1 to 4. As such, an internal structure of the static transfer switch 10 may be further simplified through one breaker and one silicon controlled rectifier element that are paired with each other, and a time period until a current of the standby power source is supplied to load may be further shortened according to the simplified structure.

Figure 5:
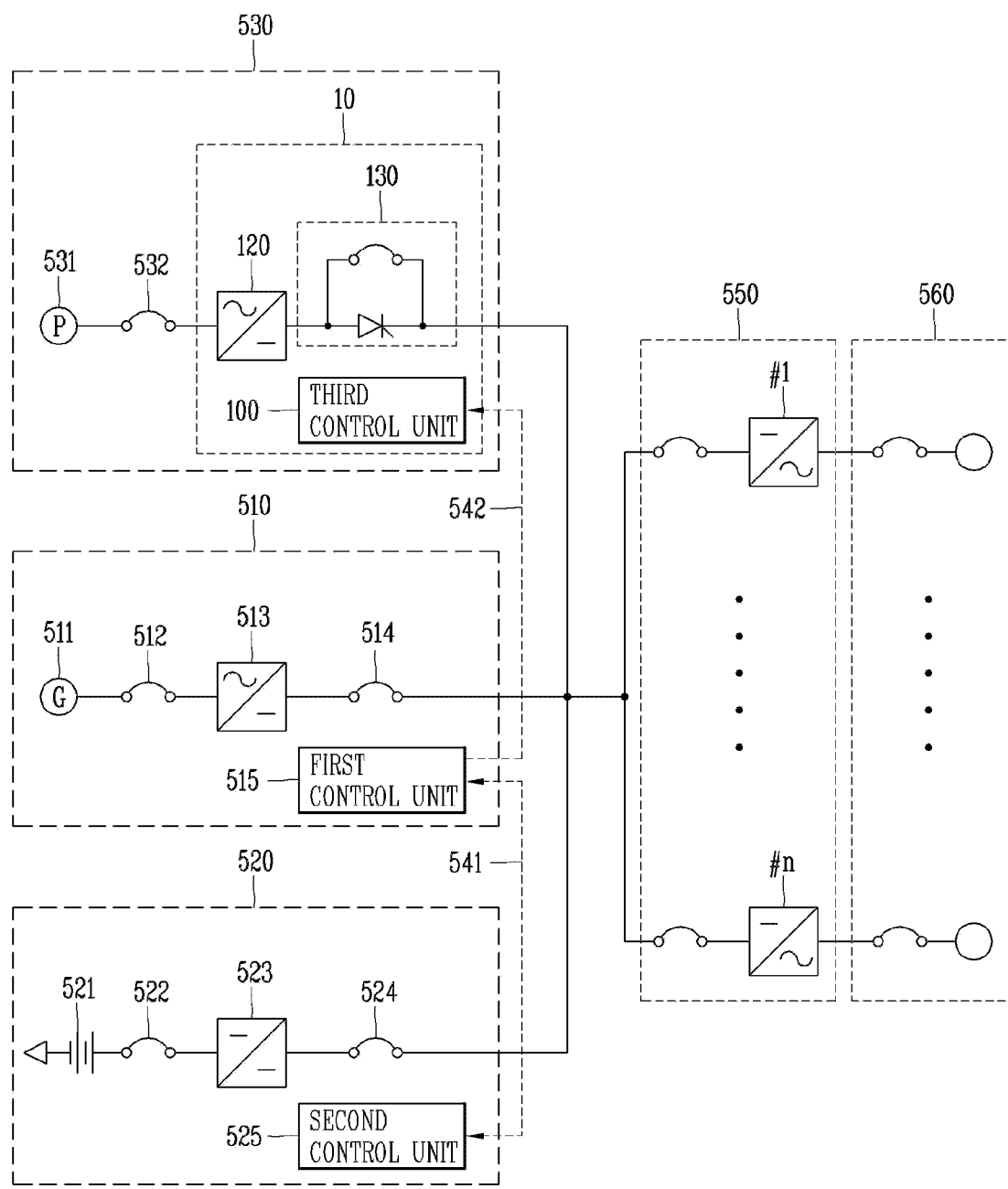
FIG. 5 is a block diagram illustrating an embodiment of a UPS module having a static transfer switch related to the present disclosure.

On the other hand, FIG. 5 is a block diagram illustrating an embodiment of a UPS module having the static transfer switch 10 related device to the foregoing present disclosure.

Referring to FIG. 5, the UPS module according to an embodiment of the present disclosure may be divided into a power-side power conversion unit and a load-side power conversion unit.

Here, the power-side power conversion unit may include a plurality of power sources, and may convert power supplied from each of the plurality of power sources into DC power to output the converted DC power. Furthermore, the load-side power conversion unit may include a plurality of loads, and may convert the DC power output from the power-side power conversion unit into driving power to supply the driving power to each of a plurality of loads.

First, the power-side power conversion unit may include a plurality of power supply control modules 510, 520, 530 whose outputs are connected to one another. Here, the first power supply control module 510 may convert power supplied from a commercial power source 511 into DC power to output the converted DC power. Furthermore, the second power supply control module 520 may output power supplied from a battery 521. In addition, the third power supply control module 510, which is a module that converts power supplied from a standby power source 531 into DC power to output the converted DC power, may include the static transfer switch 10 including the AC-DC converter 120 and the switch 130 described above with reference to FIGS. 1 to 4.

Meanwhile, the load-side power conversion unit may include at least one load 560 and at least one converter 550 that converts DC power supplied from the power-side power conversion unit into driving power. Here, the converter 550 may include at least one of an inverter that converts DC power into AC power and an inverter that converts DC power into another DC power at another voltage depending on whether the load 60 is a load driven by AC power or a load driven by DC power. Furthermore, each inverter may be connected to each load, and power converted through the connected inverter may be supplied to each load as driving power.

Meanwhile, the output terminals of each of the power supply control modules 510, 520, 530 constituting the power-side power conversion unit may be connected to one another to define a single common output terminal. Furthermore, the load-side power conversion unit may be connected to the common output terminal to convert a DC current supplied through the common output terminal into driving power and supply the driving power to the load.

More specifically, looking at the power supply control modules constituting the power-side power conversion unit, first, the first power supply control module 510 connected to the commercial power source 511 to receive power from the commercial power source 511 may include a first AC-DC converter 513 for converting an AC current input from the commercial power source 511 into a DC current.

Furthermore, a first front-side breaker 512 for protecting the first AC-DC converter 513 from an overcurrent and an arc generated from the commercial power source 511 may be disposed between the first AC-DC converter 513 and the commercial power source 511. Furthermore, a first rear-side breaker 514 for protecting an internal system including the common output terminal may be included between the common output terminal and the first AC-DC converter 513. Furthermore, a first control unit 515 for controlling an overall operation of the first power supply control module 510 and each component of the first power supply control module 510 may be included.

Here, a state in which the first front-side breaker 512 and the first rear-side breaker 514 are closed is a default state, and the closed state (circuit-connected state) may be maintained unless an abnormal current such as an overcurrent occurs.

Furthermore, the second power supply control module 520 connected to the battery 521 to receive power from the battery 521 may include a DC-DC converter 523 for stabilizing a DC current input from the battery 521 or converting the DC current into a DC current at a different voltage.

In addition, a second front-side breaker 522 for protecting the DC-DC converter 523 when an abnormal voltage or an abnormal current occurs may be disposed between the DC-DC converter 523 and the battery 521. Furthermore, a second rear-side breaker 524 for protecting an internal system including the common output terminal may be included between the common output terminal and the first DC-DC converter 523. Furthermore, a second control unit 525 for controlling an overall operation of the second power supply control module 520 and each component of the second power supply control module 520 may be included.

Here, a state in which the second front-side breaker 522 and the second rear-side breaker 524 are closed is a default state, and the closed state (circuit-connected state) may be maintained unless an abnormal current such as an overcurrent occurs.

Meanwhile, the third power supply control module 530 connected to the standby power source 531 to receive power from the standby power source 531 may include the second AC-DC converter 120 for converting an AC current input from the standby power source 531 into a DC current. Furthermore, a third breaker 532 for protecting the second AC-DC converter 120 from an overcurrent and an arc generated from the standby power source 531 may be disposed between the second AC-DC converter 120 and the standby power source 531. Here, a closed state of the third breaker 532 is a default state, and the closed state may be maintained unless an abnormal current such as an overcurrent occurs.

Furthermore, the switch 130 in which a silicon controlled rectifier element and a breaker are connected in parallel may be included between the second AC-DC converter 120 and the common output terminal. A third control unit 535 for controlling the switch 130 may be included.

Here, the third control unit 535 may be the control unit 100 of the static transfer switch 10 according to the embodiment of the present disclosure described with reference to FIGS. 1 to 4. In this case, the second AC-DC converter 120, the switch 130, and the third control unit 535 may constitute the static transfer switch 10 according to the embodiment of the present disclosure described with reference to FIGS. 1 to 4.

Accordingly, an open state of the switch 130 is a default state, and the open state (a state in which circuit connection is cut off) may be maintained unless the state is not changed by the third control unit 535.

On the other hand, the power-side power conversion unit may be controlled by the control units 515, 525, 535 of the individual power supply control modules 510, 520, 530 to supply a DC current to any one power supply control module through the common output terminal.

More preferably, the first control unit 515 of the first power supply control module 510 connected to the commercial power source 511 may be a main control unit, and in this case, any one power supply control module may supply a DC current through the common output terminal according to the control of the main control unit.

More specifically, the first control unit 515 may first control power to be supplied through the first power supply control module. Accordingly, an AC current supplied from the commercial power source 511 may be converted into a DC current through the first AC-DC converter 513, and the converted DC current may be supplied to the load-side power conversion unit through the common output terminal.

In this state, when an abnormality occurs in the power system of the commercial power source 511, for example, when an overcurrent occurs, a connection between the commercial power source 511 and the common output terminal may be cut off while the first front-side breaker 512 or first rear-side breaker 514 are open.

In this case, power may be supplied to the load-side power conversion unit through the second power supply control module 520 or the third power supply control module 530 connected to the common output terminal, and in the case of the third power supply control module 530, the circuit may not be connected thereto since an open state of the switch 130 is a default state, and thus a DC current supplied from the battery 512 through the second power supply control module 520 may be supplied to the load-side power conversion unit.

Meanwhile, when the commercial power source 511 is restored while the DC current of the battery 512 is supplied to the load-side power conversion unit, the first control unit 515 may connect the commercial power source 511 again by closing the open first front-side breaker 512 or the open first rear-side breaker 514. Then, a current supplied from the commercial power source 511 may be supplied to the load-side power conversion unit through the common output terminal.

However, when the battery 512 is completely discharged before the commercial power 511 is restored, the second control unit 525 transmits a feedback signal for notifying the discharge of the battery 511 to the first control unit 515 which is the main control unit. Then, the first control unit 515 may transmit a preset conduction signal to the third control unit 535, and the third control unit 535 controls the switch 130 to electrically connect the output terminal of the second AC-DC converter 120 and the common output terminal to each other.

In this case, the third control unit 535 may transmit a control signal (e.g., a turn-on signal to the silicon controlled rectifier element, a close signal to the breaker) for connecting the circuit to the silicon controlled rectifier element and the breaker at the same time to the switch 130. Then, the control signal may be input to the silicon controlled rectifier element and the breaker at the same time.

Meanwhile, even when the control signal is received by the silicon controlled rectifier element and the breaker at the same time, the circuit may be connected to the silicon controlled rectifier element, which is much faster in operation speed, before the breaker. Accordingly, the output terminal of the second AC-DC converter 120 and the common output terminal may be primarily conducted through the silicon controlled rectifier element, and a current supplied from the standby power source 531 through the silicon controlled rectifier element may be supplied to the load-side power conversion unit through the common output terminal. Therefore, when the battery 512 is completely discharged, the current of the standby power source 531 may be seamlessly supplied.

Meanwhile, the circuit may be connected to the breaker of the switch 130 that has received the control signal later than the silicon controlled rectifier element according to a difference in operating speed. Accordingly, the output terminal of the second AC-DC converter 120 and the common output terminal may be secondarily conducted through the breaker.

In this case, the output terminal of the second AC-DC converter 120 and the common output terminal may be connected through both a first path passing through the silicon controlled rectifier element and a second path passing through the breaker. In this case, a current supplied from the standby power source 531 may be supplied to the load-side power conversion unit through the common output terminal via the first path and the second path.

Meanwhile, the third control unit 535 may transmit a control signal for turning off the silicon controlled rectifier element to the switch 130 when the output terminal of the second AC-DC converter 120 and the common output terminal are connected through the second path.

Then, the silicon controlled rectifier element may be turned off, and as a result, the output terminal of the second AC-DC converter 120 and the common output terminal may be connected through only one second path through the breaker. Accordingly, a current supplied from the standby power source 531 via the second path may be supplied to the load-side power conversion unit through the common output terminal.

On the other hand, in the foregoing description of FIG. 5, an example in which the power supply control module (first power supply control module) connected to the commercial power source 511 and the power supply control module (second power supply control module) connected to the battery 521 are provided with independent modules, respectively, has been described, the first power supply control module and the second power supply control module may of course be integrated into a single module.

Figure 6:
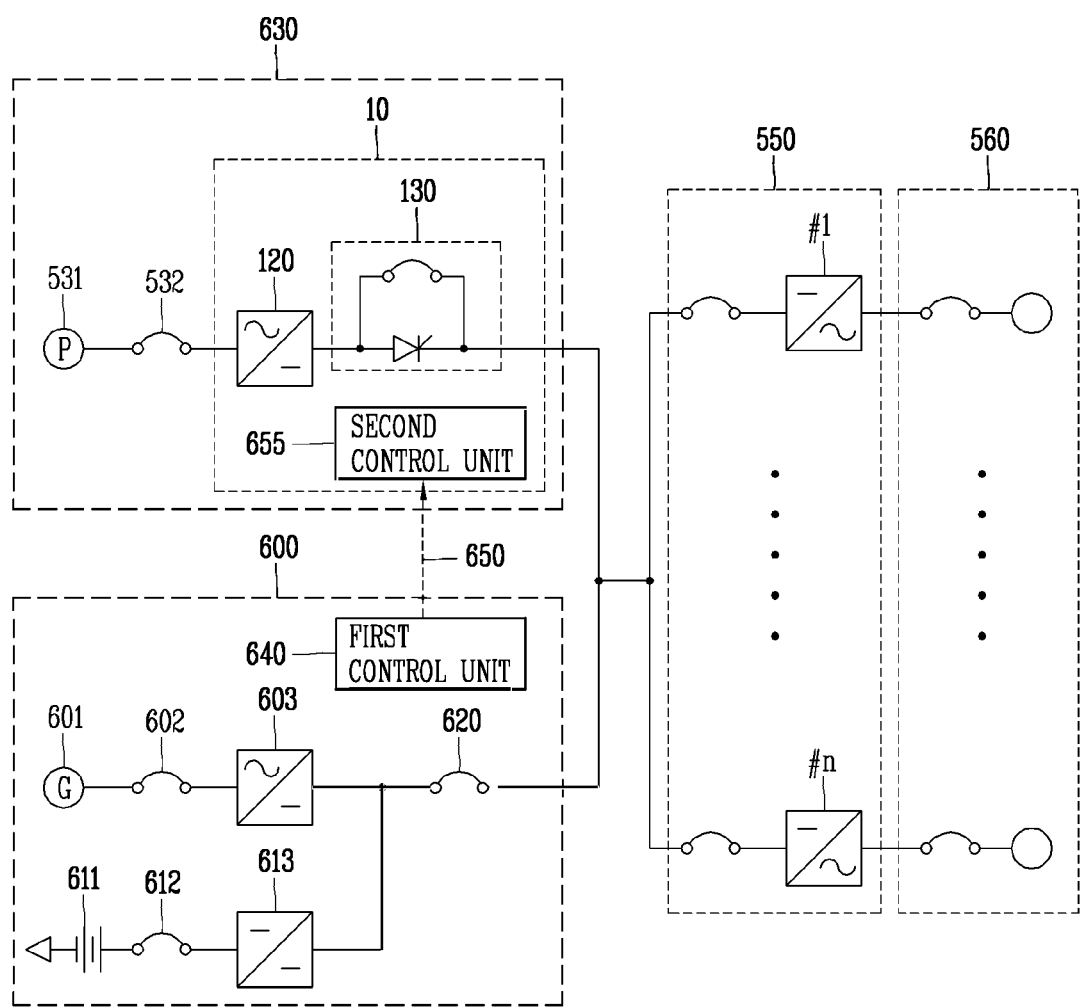
FIG. 6 is a block diagram illustrating another embodiment of a UPS module having a static transfer switch according to the present disclosure.

FIG. 6 shows an example of a UPS module according to a second embodiment of the present disclosure in which a power supply control module that receives power from the commercial power source 511 and a power supply control module that receives power from the battery 521 are integrated as described above.

Looking at the UPS module according to the second embodiment of the present disclosure with reference to FIG. 6, the UPS module according to the second embodiment may include a power-side power conversion unit including an integrated module 600 that receives power from a commercial power source 601 and a battery 611, and a standby module 630 that receives power from the standby power source 531, and a load-side power conversion unit including at least one load 560 and at least one converter 550.

Here, the output terminals of the integrated module 600 and the standby module 630 of the power-side power conversion unit may be connected to each other to form a single common output terminal. Furthermore, the load-side power conversion unit may be connected to the common output terminal to convert a DC current supplied through the common output terminal into driving power and supply the driving power to the load.

Looking at this in detail, first, the integrated module 600 may include a commercial power source 601, a first AC-DC converter 603 that converts an AC current input from the commercial power source 601 into a DC current, and a first breaker 602 for protecting the first AC-DC converter 603 from an overcurrent and an arc generated from the commercial power source 601.

In addition, the integrated module 600 may include a battery 611, a DC-DC converter 613 for stabilizing a DC current input from the battery 611 or converting the DC current into another DC current, and a second breaker 612 for protecting the DC-DC converter 613 from an overcurrent and an arc generated from the battery 611.

Furthermore, the output terminals of the first AC-DC converter 603 and the DC-DC converter 613 may be connected to each other to define a single output terminal. Furthermore, an integrated breaker 620 for protecting an internal system including the common output terminal may be included between the single output terminal defined by connecting the output terminals of the first AC-DC converter 603 and the DC-DC converter 613 and the common output terminal.

Here, a state in which the first breaker 602, the second breaker 612, and the integrated breaker 620 are closed is a default state, and the closed state may be maintained unless an abnormal current such as overcurrent occurs.

Meanwhile, the standby module 630 may include a second AC-DC converter 120 for converting an AC current input from the standby power source 531 into a DC current. Furthermore, a third breaker 532 for protecting the second AC-DC converter 120 from an overcurrent and an arc generated from the standby power source 531 may be disposed between the second AC-DC converter 120 and the standby power source 531.

Here, a closed state of the third breaker 532 is a default state, and the closed state may be maintained unless an abnormal current such as an overcurrent occurs.

Furthermore, the switch 130 in which a silicon controlled rectifier element and a breaker are connected in parallel may be included between the second AC-DC converter 120 and the common output terminal. Furthermore, a second control unit 655 for controlling the switch 130 may be included.

Here, the second control unit 655 may be the control unit 100 of the static transfer switch 10 according to the embodiment of the present disclosure described with reference to FIGS. 1 to 4. In this case, the second AC-DC converter 120, the switch 130, and the third control unit 655 may constitute the static transfer switch 10 according to the embodiment of the present disclosure described with reference to FIGS. 1 to 4.

Accordingly, an open state of the switch 130 is a default state, and the open state (a state in which circuit connection is cut off) may be maintained unless the state is not changed by the second control unit 535.

Looking at an operation process of the UPS module according to the second embodiment of the present disclosure, first, the first control unit 640 may convert an AC current supplied from the commercial power source 601 into a DC current through the first AC-DC converter 513 to supply the converted DC current to the load-side power conversion unit through the common output terminal.

In this state, when an abnormality occurs in the power system of the commercial power supply 601, a connection between the commercial power source 511 and the common output terminal may be cut off by opening the first breaker 602. Then, a DC current from the battery 512 of the integrated module 600 may be supplied to the load-side power conversion unit through the common output terminal.

Meanwhile, when the battery 602 is completely discharged before the commercial power 601 is restored, the first control unit 650 may transmit a preset conduction signal to the second control unit 655. Then, the second control unit 655 may control the switch 130 to electrically connect the output terminal of the second AC-DC converter 120 and the common output terminal to each other.

In this case, the third control unit 535 may transmit a control signal (e.g., a turn-on signal to the silicon controlled rectifier element, a close signal to the breaker) for connecting the circuit to the silicon controlled rectifier element and the breaker at the same time to the switch 130. Then, the control signal may be input to the silicon controlled rectifier element and the breaker at the same time.

The circuit may be connected to the silicon controlled rectifier element, which is much faster in operation speed, before the breaker. Accordingly, the output terminal of the second AC-DC converter 120 and the common output terminal may be primarily conducted through the silicon controlled rectifier element, and a current supplied from the standby power source 531 through the silicon controlled rectifier element may be supplied to the load-side power conversion unit through the common output terminal. Therefore, when the battery 611 is completely discharged, the current of the standby power source 531 may be seamlessly supplied.

Meanwhile, the circuit may be connected to the breaker of the switch 130 that has received the control signal later than the silicon controlled rectifier element according to a difference in operating speed. Accordingly, the output terminal of the second AC-DC converter 120 and the common output terminal may be secondarily conducted through the breaker.

In this case, the output terminal of the second AC-DC converter 120 and the common output terminal may be connected through both a first path passing through the silicon controlled rectifier element and a second path passing through the breaker. In this case, a current supplied from the standby power source 531 may be supplied to the load-side power conversion unit through the common output terminal via the first path and the second path.

Meanwhile, the second control unit 655 may transmit a control signal for turning off the silicon controlled rectifier element to the switch 130 when the output terminal of the second AC-DC converter 120 and the common output terminal are connected through the second path. Then, the silicon controlled rectifier element may be turned off, and as a result, the output terminal of the second AC-DC converter 120 and the common output terminal may be connected through only one second path through the breaker. Accordingly, a current supplied from the standby power source 531 via the second path may be supplied to the load-side power conversion unit through the common output terminal.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). Furthermore, the computer may include the control unit 100 of the steady transfer switch or at least one control unit of individual power supply control modules of the UPS module. The above detailed description are therefore to be construed in all aspects as illustrative and not restrictive. The scope of the invention should be determined by reasonable interpretation of the appended claims and all changes that come within the equivalent scope of the invention are included in the scope of the invention.

The invention claimed is:

1. A switch comprising:
 one semiconductor rectifier element connected to either one of a positive terminal and a negative terminal of a DC power source;
 a bypass electric circuit that connects an input terminal and an output terminal of the semiconductor rectifier element to bypass the semiconductor rectifier element;
 a breaker that opens or closes the bypass electric circuit; and
 a control unit that controls the semiconductor rectifier element to conduct a current, and controls the breaker to close the bypass electric circuit when a preset conduction signal is received, and controls the semiconductor rectifier element to stop the conduction of the current when the bypass electric circuit is closed by the breaker, and
 wherein the control unit controls the semiconductor rectifier element and the breaker at the same time according to the conduction signal, detects whether the bypass electric circuit is closed when a current is first conducted through the semiconductor rectifier element due to an operating speed difference between the semiconductor rectifier element and the breaker, and controls the semiconductor rectifier element to stop the conduction of the current according to the detection result.

2. The switch of claim 1, wherein the semiconductor rectifier element is a silicon controlled rectifier element.

3. The switch of claim 1, further comprising:
 a second semiconductor rectifier element connected to a polarity terminal and the other polarity terminal of the DC power source to which the semiconductor rectifier element and the bypass electric circuit are connected;
 a second bypass electric circuit that connects an input terminal and an output terminal of the second semiconductor rectifier element to bypass the second semiconductor rectifier element; and
 a second breaker controlled by the control unit to open or close the second bypass electric circuit,
 wherein the control unit controls the second semiconductor rectifier element to conduct a current, and controls the second breaker to close the second bypass electric circuit when the conduction signal is received, and further controls the semiconductor rectifier element to stop the conduction of the current when the second bypass electric circuit is closed by the second breaker.

4. The switch of claim 3, wherein the semiconductor rectifier element and the second semiconductor rectifier element are arranged such that forward current directions thereof coincide with current directions of the DC power source, and are arranged in different directions according to the polarities of the DC power source connected thereto.

5. The switch of claim 1, wherein the control unit determines whether the bypass electric circuit is closed based on a feedback signal received from the breaker or a voltage change based on a current supplied through the bypass electric circuit or the semiconductor rectifier element.

6. A static transfer switch comprising:
an AC-DC converter that converts an AC current supplied from a preset AC power source into a DC current;
first and second semiconductor rectifier elements connected to positive and negative output terminals of the AC-DC converter, respectively;
first and second bypass electric circuits that connect an input terminal and an output terminal of each of the first and second semiconductor rectifier elements to bypass the first and second semiconductor rectifier elements;
first and second breakers that open or close the first and second bypass electric circuits; and
a control unit that controls the first and second semiconductor rectifier elements or the first and second breakers to conduct currents of the positive and negative output terminals of the AC-DC converter through either one of first paths passing through the first and second semiconductor rectifier elements or second paths passing through the first and second bypass electric circuits when a preset conduction signal is received.

7. The static transfer switch of claim 6, wherein the first and second semiconductor rectifier elements are silicon controlled rectifier elements, respectively.

8. The static transfer switch of claim 7, wherein the control unit turns on the first and second silicon controlled rectifier elements to conduct currents therethrough, controls the first and second breakers to close the first and second bypass electric circuits when the conduction signal is received, allows currents to be first conducted through the first and second silicon controlled rectifier elements according to an operating speed difference between the silicon controlled rectifier element and the breaker, and turns off the first and second silicon controlled rectifier elements when the first and second bypass electric circuits are closed while the currents are conducted through the first and second silicon controlled rectifier elements.

9. The static transfer switch of claim 8, wherein the control unit determines whether the first and second bypass electric circuits are closed based on a feedback signal from the first and second breakers or a voltage change based on a current supplied through the first and second bypass electric circuits or the first and second silicon controlled rectifier elements.

10. The static transfer switch of claim 8, wherein when currents are conducted through the first and second silicon controlled rectifier elements before the first and second bypass electric circuits are closed, currents of the positive and negative output terminals of the AC-DC converter are output through the first paths, and
wherein when the first and second bypass electric circuits are closed while the currents are conducted through the first and second silicon controlled rectifier elements, the currents of the positive and negative output terminals of the AC-DC converter are output through both the first paths and the second paths, and when the first and second silicon controlled rectifier elements are turned off while the first and second bypass electric circuits are closed, the currents of the positive and negative output terminals of the AC-DC converter are output only through the second paths.

11. The static transfer switch of claim 6, wherein the AC-DC converter comprises a rectifier element bridge comprising a plurality of rectifier elements, and wherein the rectifier elements are diodes or silicon controlled rectifier elements.

12. The static transfer switch of claim 6, wherein the preset AC power source is a standby power source that supplies power to a load through a path different from that of the commercial power source, and
wherein the preset conduction signal, which is a signal that controls the control unit to output a current supplied from the standby power source, is received from another power supply control apparatus connected to the commercial power source.

13. An uninterruptible power supply (UPS) module comprising:
a first power supply control module comprising a first AC-DC converter that converts an AC current supplied from a commercial power source into a DC current to output the converted DC current;
a second power supply control module comprising a DC-DC converter that stabilizes a DC current supplied from a battery or converts the DC current into a DC current at a different voltage to output the converted DC current;
a third power supply control module comprising a second AC-DC converter that converts an AC current supplied from a standby power source into a DC current to output the converted DC current; and
a common output terminal defined by connecting output terminals of the first to third power supply control modules to one another to supply a DC current output from any one of the first to third power supply control modules to a load,
wherein in the third power supply control module, breakers and silicon controlled rectifier elements paired with each other are connected in parallel between an output terminal of the second AC-DC converter and the common output terminal, and
wherein in the breakers and the silicon controlled rectifier elements paired with each other, one breaker and one silicon controlled rectifier element are paired with each other to connect in parallel between the output terminal of the second AC-DC converter and the common output terminal.

14. The UPS module of claim 13, wherein the third power supply control module comprises:
first and second silicon controlled rectifier elements connected between positive and negative output terminals of the second AC-DC converter and positive and negative output terminals of the third power supply control module, respectively;
first and second bypass electric circuits connected between an input terminal and an output terminal of each silicon controlled rectifier element to bypass the first and second silicon controlled rectifier elements, respectively;
first and second breakers that open or close the first and second bypass electric circuits; and a switch provided with a switch control unit that turns on the first and second silicon controlled rectifier elements to conduct currents therethrough, controls the first and second breakers to close the first and second electric circuits when the conduction signal is received, and turns off the first and second silicon controlled rectifier elements when the first and second bypass circuits are closed while currents are first conducted through the first and second silicon controlled rectifier elements according to an operating speed difference between the silicon controlled rectifier element and the breaker.

15. The UPS module of claim 13, wherein the conduction signal is received from a first control unit of the first power supply control module, and wherein the first control unit transmits the preset conduction signal to the switch control unit when both power supply of the commercial power source and power supply from the battery are stopped.

16. The UPS module of claim 14, wherein the first and second breakers close the first and second bypass electric circuits according to the control of the switch control unit in a default state in which the first and second bypass circuits are open, and wherein the first and second silicon controlled rectifier elements are turned on according to the control of the switch control unit in a default state that is turned off.

17. The UPS module of claim 13, wherein a plurality of breakers are included between the commercial power source and the common output terminal, and between the battery and the common output terminal, respectively, and wherein the plurality of breakers are configured to be cut off between the commercial power source and the common output terminal or between the battery and the common output terminal when an overcurrent flows from the commercial power source or the battery in a default state that is configured to connect between the commercial power source and the common output terminal or between the battery and the common output terminal.

18. An uninterruptible power supply (UPS) module comprising:

a first module connected to a commercial power source and a battery, the first module comprising a first AC-DC converter that converts an AC current supplied from the commercial power source into a DC current, and a DC-DC converter that stabilizes a DC current supplied from the battery or converts the DC current into a DC current at a different voltage, so as to output either one of a current supplied from the commercial power source and a current supplied from the battery through a first output terminal defined by connecting an output of the first AC-DC converter and an output of the DC-DC converter to each other;

a second module comprising a second AC-DC converter that converts an AC current supplied from a standby power source into a DC current to output the converted DC current; and a second output terminal defined by connecting the first output terminal and an output terminal of the second module to each other to supply a DC current output from either one of the first module and the second module to a load, wherein in the second module, breakers and silicon controlled rectifier elements paired with each other are connected in parallel between an output terminal of the second AC-DC converter and the second output terminal, and wherein in the breakers and the silicon controlled rectifier elements paired with each other, one breaker and one silicon controlled rectifier element are paired with each other to connect in parallel between the output terminal of the second AC-DC converter and the second output terminal.

19. The UPS module of claim 18, wherein the second module is provided with a switch, the switch comprising:

first and second silicon controlled rectifier elements connected between positive and negative output terminals of the second AC-DC converter and positive and negative output terminals of the second module, respectively;

first and second bypass electric circuits connected between an input terminal and an output terminal of each silicon controlled rectifier element to bypass the first and second silicon controlled rectifier elements, respectively;

first and second breakers that control the opening or closing of the first and second bypass electric circuit; and a switch control unit that turns on the first and second silicon controlled rectifier elements to conduct currents therethrough, controls the first and second breakers to close the first and second bypass electric circuits when a preset conduction signal is received, allows currents to be first conducted through the first and second silicon controlled rectifier elements according to an operating speed difference between the silicon controlled rectifier element and the breaker, and turns off the first and second silicon controlled rectifier elements when the first and second bypass electric circuits are closed while the currents are conducted through the first and second silicon controlled rectifier elements.

20. The UPS module of claim 19, wherein the first module is controlled by a first control unit, and wherein the first control unit transmits the preset conduction signal to the switch control unit when both power supply of the commercial power source and power supply from the battery are stopped.

* * * * *